United States Patent [19]

Patel

[11] Patent Number: 4,867,489
[45] Date of Patent: Sep. 19, 1989

[54] TUBE FITTING

[75] Inventor: Hiralal V. Patel, Dublin, Ohio

[73] Assignee: Parker Hannifin Corporation, Cleveland, Ohio

[21] Appl. No.: 99,186

[22] Filed: Sep. 21, 1987

[51] Int. Cl.⁴ ............................................. F16L 19/08
[52] U.S. Cl. .................................. 285/342; 285/382.7
[58] Field of Search .................... 285/382.7, 343, 342, 285/341

[56] References Cited

U.S. PATENT DOCUMENTS

| | | | |
|---|---|---|---|
| 2,466,527 | 4/1949 | Wolfram | 285/382.7 X |
| 2,693,374 | 11/1954 | Wurzburger | 285/382.7 X |
| 2,912,262 | 11/1959 | Franck | 285/382.7 X |
| 3,025,084 | 3/1962 | Franck | 285/382.7 X |
| 3,687,494 | 8/1972 | Graff | 285/382.7 X |
| 3,857,591 | 12/1974 | Voss | 285/382.7 X |
| 4,136,897 | 1/1979 | Haluch | 285/382.7 X |
| 4,529,231 | 7/1985 | Greenawalt | 285/382.7 X |

FOREIGN PATENT DOCUMENTS

| | | | |
|---|---|---|---|
| 285541 | 6/1966 | Australia | 285/343 |
| 456268 | 7/1968 | Switzerland | 285/343 |

Primary Examiner—Thomas F. Callaghan
Attorney, Agent, or Firm—Christopher H. Morgan

[57] ABSTRACT

A fitting for joining a tube to a threaded body member includes a nut having a conical camming surface and a collapsible sleeve with a mating conical surface and internal annular serrations for gripping the tube. A seal in the face of the body member seals against a front transverse shoulder of the sleeve while an internal groove in the sleeve houses an o-ring for sealing against the tube. The rear wall of the groove is in a dogleg configuration and is engaged with the rear end of the sleeve to be collapsed therewith into close engagement and embedment with the tube to prevent seal extrusion at high pressures. The sleeve includes stop shoulders thereon to limit threaded engagement of the nut and thus the collapse of the sleeve and is disclosed in one and two piece embodiments.

10 Claims, 2 Drawing Sheets

TUBE FITTING

BACKGROUND OF THE INVENTION

This invention relates to tube fittings of the deformable sleeve type and more particularly to a high pressure face seal type fitting in which the sleeve combines the mechanical grip of bite edges with the sealing efficiency of an elastomeric seal.

High pressure fittings of this type have been devised in the past with varying degrees of success. For example, in U.S. Pat. No. 4,529,231 there is shown a flat face tube connector having a face seal between the connector sleeve and the body to be sealed. In this fitting a plurality of radially projecting annular serrations are adapted to be compressed into fluid sealing engagement with the periphery of a tube and to supply the mechanical grip thereon as well. An elastomeric seal is described in this type of fitting for backup purposes but it is suggested that the seal is not necessary since a metal to metal seal is achieved at the gripping serrations. As seen in FIG. 1 of this patent, the elastomeric seal is urged under fluid pressure to the narrow end of a recess in the sleeve and cooperates with the embedded gripping serrations to prevent fluid leakage. It has been determined that this type of fitting does not provide a reliable fluid seal since the elastomeric seal does not consistently move to the narrow end of the internal recess and since the gripping serrations do not provide a reliable fluid seal in and of themselves as suggested in the disclosure.

Another form of prior art fitting which combines mechanical grip means and an elastomeric seal is shown in U.S. Pat. No. 2,466,527. In this design of fitting, a cutting edge at the rearward end of the sleeve is forced into biting engagement with the tube to provide a mechanical grip while an elastomeric seal is trapped in a recess at the forward end of the sleeve between the body member to be sealed and the inserted tube. A stop device is also shown in this design of fitting for controlling the axial interengagement between the nut and body member and thus the penetration of the cutting edge of the sleeve. However, this design of fitting is not particularly suited for high pressure applications since the rearward wall of the recess entrapping the elastomeric seal is sized for a free fit of the tubing therein leaving a gap through which the seal can extrude at high pressure levels.

A variation of this type of fitting is shown in U.S. Pat. No. 3,687,494. In this design of fitting, the forward cutting edge of the sleeve is forced into the periphery of the tube surface by a conical camming member while the rear end of the sleeve includes a recess closely conforming to the configuration of the entrapped elastomeric seal. This recess becomes deformed to a more open condition as the seal is compressed upon threaded engagement of the nut. Again, this type of fitting is not especially suited for high fluid pressure levels as little attention is directed to closure of the rear end of the recess of the sleeve, thereby allowing potential extrusion of the seal therethrough.

A similar form of fitting is shown in U.S. Pat. No. 3,025,084 which again includes the combination of the biting edge of a deformable sleeve member, and an entrapped elastomeric seal. This fitting also describes deformation of the annular recess containing the elastomeric seal in forcing the seal against the outer periphery of the tube. However, again, space must be provided between the rear end of the sleeve and the externally threaded nut to allow clearance for insertion of the tube therein, and this provides a path for extrusion of the elastomeric seal.

One form of prior art fitting which separates portions of a sleeve by a deformable bridge section is shown in U.S. Pat. No. 2,693,374. In this design of fitting, a face seal is effected at the forward end of the sleeve while a gripping edge is forced into the tube surface by means of a camming conical surface in the nut. An intermediate bridge section is deformed into engagement with the periphery of the tube and serves to confine the ridge formed by the cutting edge to provide a secure mechanical grip upon the tube combined with a fluid seal at that location. This type of fitting does not employ elastomeric seals at either the face seal location or within the recess of the sleeve at the bridge location.

SUMMARY OF THE INVENTION

The deficiencies of the prior art fittings are resolved to a great extent in the fitting design of the instant invention. Here a sleeve of the fitting includes separated grip and seal sections with a deformable connector device therebetween which establishes a firm engagement with the periphery of the tube to be sealed independently of the gripping edges of the sleeve. Two embodiments of the invention are described in a unitary sleeve configuration and in a two-piece sleeve configuration. In the preferred embodiment of the unitary sleeve design the sleeve includes a front shoulder having a flat sealing face thereon which engages a similar face of a body member to be sealed, the latter including an annular groove and face seal therein. The sleeve is drawn into firm engagement with the body member and with the tube by means of a threaded nut having an internal conical camming surface therein. This surface cooperates with an external conical surface at the rearward end of the sleeve to radially collapse the sleeve and urge the gripping edges at the rearward end thereof into biting engagement with the tube. The front and rear sections of the sleeve, providing respectively the sealing and gripping functions, are joined by means of a dogleg connector, which dogleg is deformable into tight frictional engagement with the exterior surface of the tube. An internal groove is included in the front section of the sleeve and houses an elastomeric o-ring to provide the fluid sealing function. The rearward wall of the groove is formed in part by the dogleg connector which, upon deformation into engagement with the tube, provides a secure entrapment for the elastomeric seal. The front section of the sleeve further includes a rear shoulder which cooperates with an internal shoulder in the nut to provide a positive stop for engagement of the nut upon the body member, and thus a control upon the depth of penetration of the sealing edges. In this configuration, the gripping edges of the sleeve are not relied upon for creating a fluid seal with the tube periphery and could be interrupted in circumferential extent in order to achieve a better gripping action. This is possible since the fluid seal is achieved at the front section at a position displaced from the gripping edges.

A second embodiment of the invention describes the gripping and seal sections of the sleeve as two separate pieces with the gripping section having a forward portion which overlaps the dogleg connector of the seal section and further engages the rearward stop shoulder of the seal section. In this embodiment of the invention, collapse of the grip section and its cutting edges onto the tube surface acts in a similar manner to deform the dogleg section into a closed rearward wall in tight engagement with the periphery of the tube to prevent extrusion of the elastomeric seal therethrough under high fluid pressure conditions.

DETAILED DESCRIPTION OF THE INVENTION

Figure 1:
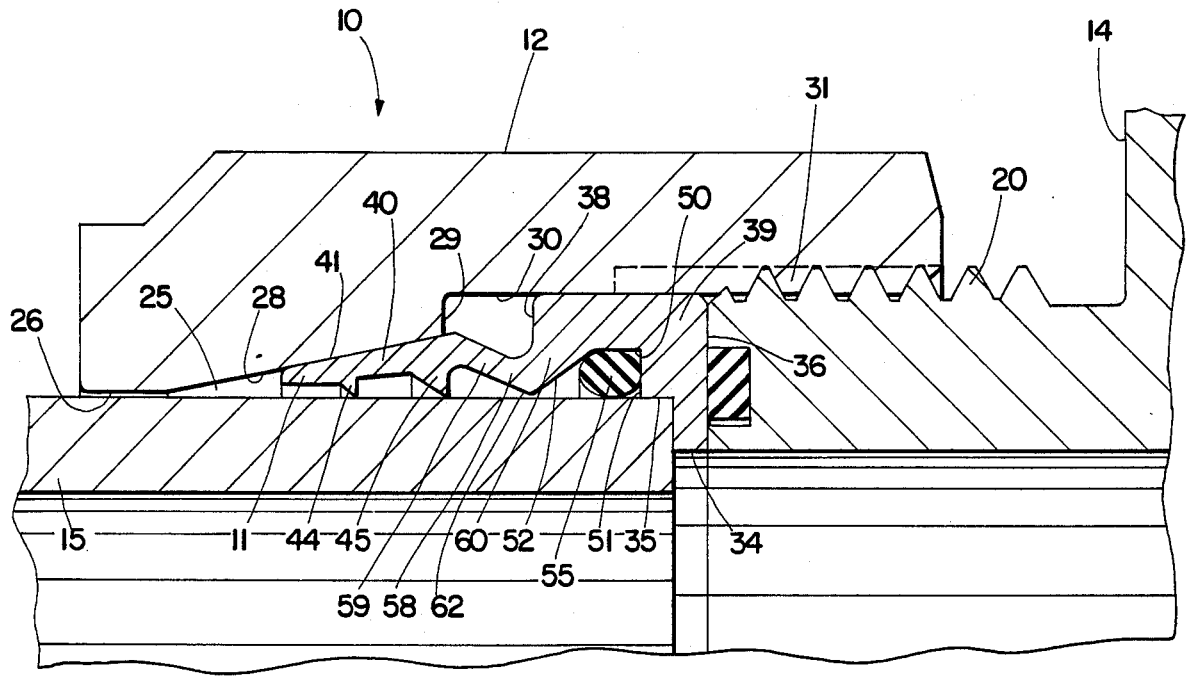
FIG. 1 is a partial sectional view of the preferred embodiment of tube fitting of the invention after initial assembly but prior to tightening of the nut on the body member.
Figure 2:
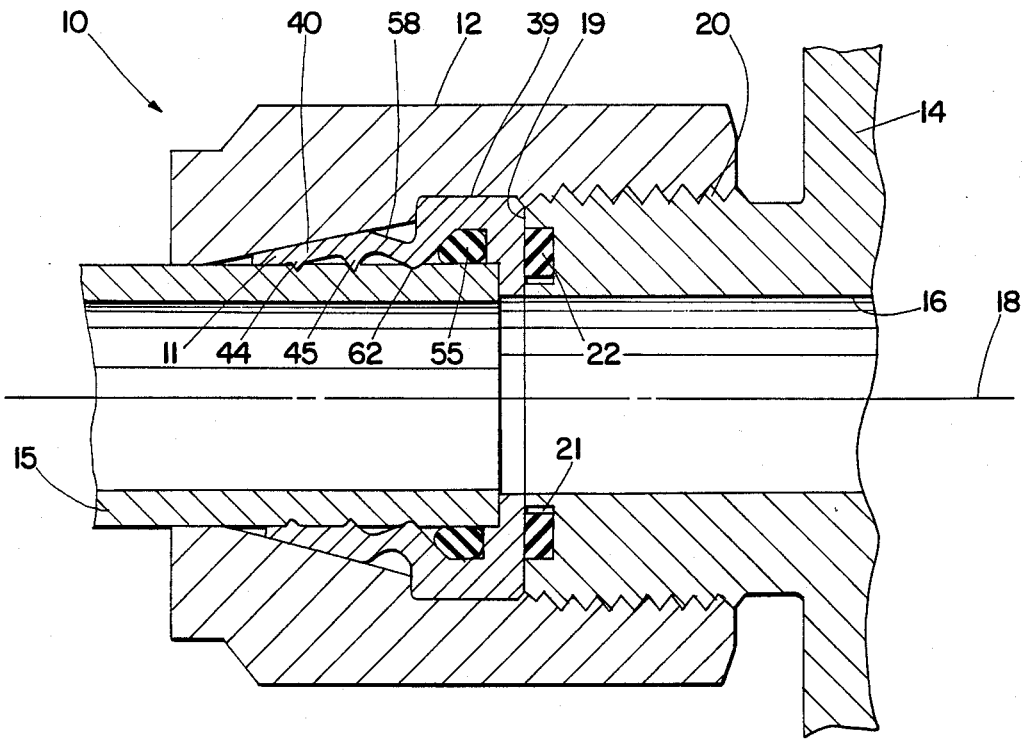
FIG. 2 is a partial sectional view of the preferred embodiment of tube fitting of the invention shown in the fully assembled condition.

Referring now to the preferred embodiment of the invention shown in FIGS. 1 and 2, the tube fitting 10 of the invention comprises essentially sleeve 11 and nut 12, the latter adapted to be threaded to body member 14 for securing tube 15 thereto. As seen in FIG. 2, body member 14 includes center bore 15 having central axis 18 and transverse seal face 19. The outer periphery of body member 14 includes external threads 20 thereon, while seal face 19 includes a concentric annular groove 21 which contains annular seal 22 therein. Seal face 19 is preferably perpendicular to central axis 18 and seal 22 is preferably a lathe cut elastomeric seal normally having an axial dimension greater than the depth of groove 21 so as to project from sealing face 19 and to be compressed in groove 21 upon being engaged by adjacent structure. Seal 22 is typically described as a face seal for body member 14.

Nut 12 includes bore 25 extending the length thereof, having a reduced support section 26 at the rearward end thereof substantially the same diameter as that of tube 15. Nut 12 further includes an internal conical cam surface 28 therein adjacent support section 26 which cam surface flares outwardly and forwardly of support section 26. Cam surface 28 is preferably at an angle of approximately 12° relative to central axis 18 and extends slightly less than ½ the overall length of nut 12 to an outwardly extending stop shoulder 29, which itself terminates at recessed cylindrical surface 30. Recessed surface 30 extends to the forward end of nut 12 and includes threads 31 at the forward end which are engageable with threads 20 of body member 14. Thus it will be clear that nut 12 may be rotated relative to body member 14 to draw nut 12 and body member 14 together to the fully engaged position depicted in FIG. 2.

In the preferred embodiment of the invention depicted in FIGS. 1 and 2, sleeve 11 is a unitary member of generally tubular configuration having a central bore 34 extending the full axial length thereof, with a short counterbore 35 at the forward end. Sleeve 11 includes a front shoulder 36 and an axially spaced rear shoulder 38, both of which are disposed substantially perpendicularly to central axis 18. The cylindrical portion of sleeve 11 between front and rear shoulders 36, 38 comprises head section 39, being sized to be slidably received within recessed surface 30 of nut 12.

The rear end of sleeve 11 is formed as a conical section 40 having an exterior conical surface 41 and first and second internal bit edges 44, 45. These edges are internal annular projections axially spaced adjacent one another and near the rearward end of sleeve 11 on the internal periphery of conical section 40. While bite edges 44, 45 are preferably continuous annular ridges, the edges may be interrupted at various circumferential locations inasmuch as the fluid sealing effectiveness at this location is not significant to the proper operation of the fitting.

Sleeve 11 further includes inner annular groove 50 in head section 39 and spaced generally centrally between front and rear shoulders 36, 38. Groove 50 includes perpendicular forward wall 51 and rearwardly spaced, angled rear wall 52 with an intermediate bottom wall which is sized to receive o-ring seal 55 in a manner such that seal 55 normally projects beyond the wall forming counterbore 35 and is slightly deformed by insertion of tube 15 into counterbore 35.

Sleeve 11 further includes dogleg section 58 between head section 39 and conical section 40. This section 58 is called a dogleg section since, in cross section, this section has a freely extending, dogleg-shaped bend as seen in the FIGS. 1-3. Dogleg section 58 comprises an outwardly rearwardly flared conical section 59 and an outwardly forwardly flared conical section 60 with an elbow intersection 62 therebetween. The inner periphery of sleeve 11 at elbow 62 is a smoothly curved intersection surface with a generous radius. Rear conical section 59 is generally of uniform radial thickness between intersection 62 and sleeve conical section 40 while the forward conical section 60 of dogleg 58 becomes radially thickened forwardly of intersection 62 and blends into perpendicular rear shoulder 38 at the outer periphery and into angled rear wall 52 of groove 50 at the inner periphery of sleeve 11. In the partially assembled view of FIG. 1, rear wall 52 of groove 50 extends at an angle of approximately 40° with respect to central axis 18 while rear conical section 59 of dogleg 58 extends rearwardly at an angle of approximately 25°.

The head section 39 of sleeve 11 thus forms a front seal section while conical section 40 serves as a rear grip section with the sections being joined or connected by dogleg section 58. As seen in FIG. 1, the intersection surface 62 of sleeve 11 is sized to be spaced a slight distance from the outer periphery of tube 15 so that tube 15 may be freely inserted into counterbore 35. Similarly, first and second bite edges 44, 45 are dimensioned so that their tips are free of tube 15. Upon further threaded engagement of nut 12 with respect to body member 14, nut 12 will be moved to the right as viewed in FIGS. 1 and 2 to the final position depicted in FIG. 2. During this movement, nut conical cam surface 28 engages sleeve conical surface 41 to collapse the rearward end of sleeve 11 in a substantially solely radial direction forcing cutting edges 44, 45 to penetrate into the outer periphery of tube 15 to the position depicted in Figure 2. During the collapsing movement of the outer end of sleeve 11, dogleg 58 will be similarly collapsed to the position depicted in FIG. 2 where intersection surface 62 will be in tight engagement with the outer periphery of tube 15 and somewhat slightly embedded therein. The degree of embedment of intersection surface 62 into the surface of tube 15 will depend upon the relative hardness of sleeve 11 and tube 15, the degree of curvature of intersection surface 62, the shape and configuration of the forward conical section 60 and rear conical section 59 of sleeve 11, and further considerations. However, in any event, rear wall 52 of groove 50 will be deformed a few degrees toward a more nearly vertical position as depicted in FIG. 2. In the final assembled condition of FIG. 2, rear wall 52 completely closes the rearward end of groove 50 preventing extrusion of seal 55 rearwardly of groove 50 under high fluid pressures encountered in bore 16 of body member 14.

Also, as noted in FIG. 2, stop shoulder 29 of nut 12 has engaged rear shoulder 38 of sleeve 11 to positively limit further threaded engagement between nut 12 and body member 14 thereby controlling the depth of penetration of first and second bite edges 44, 45 into tube 15 as well as controlling the depth of embedment of dogleg inner section surface 62 into tube 15.

In a typical fitting 10 designed for 0.5 inch diameter tube, sleeve 11 may be on the order of 0.5 inch overall axial length and 0.75 inch diameter. Intersection 62 is disposed initially just rearwardly of rear shoulder 38 and after deformation may be close to alignment with shoulder 38. Rear conical section 59 of dogleg 58 extends rearwardly on the order of 0.15 inch to a junction with conical section 40 of sleeve 11, approximately in alignment with forward bite edge 45. Bite edge 45 in turn is spaced about 0.2 inch from the rear end of sleeve 11. Thus, it will be apparent that rear conical section 59 of dogleg 58 forms a relatively long lever to control deformation of intersection 62 and assure firm engagement with tube 15.

Figure 3:
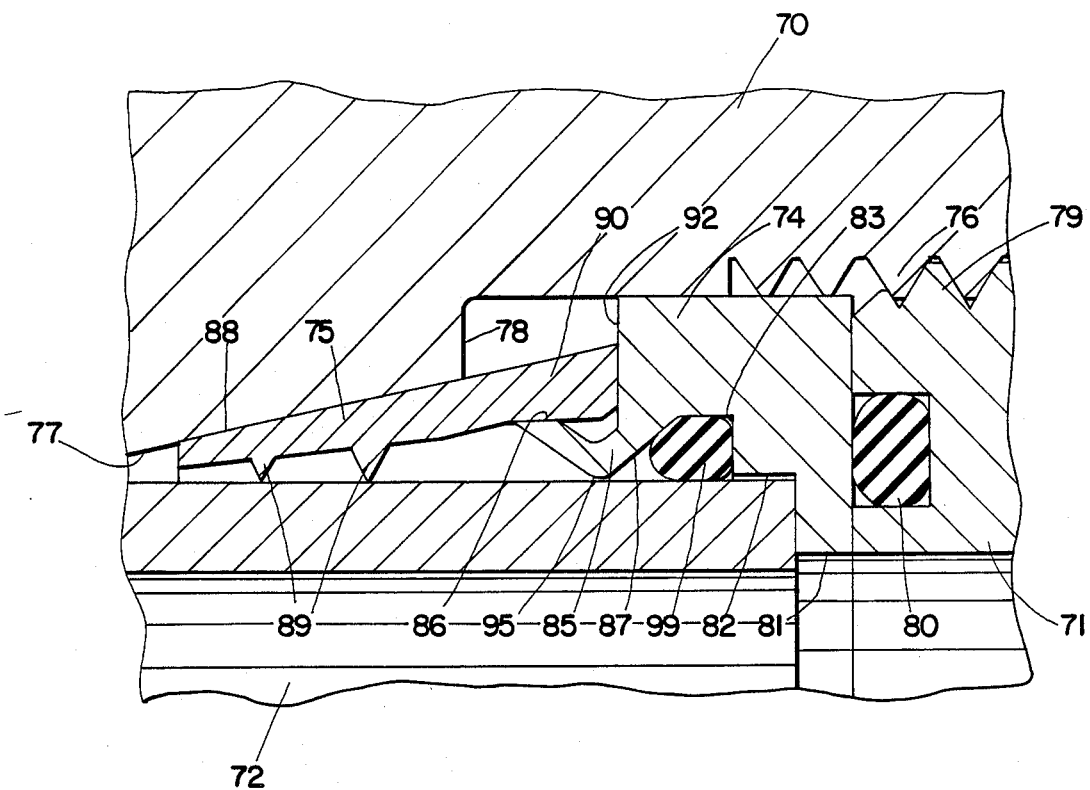
FIG. 3 is a partial sectional view of a second embodiment of tube fitting of the invention shown in a partially assembled condition prior to tightening of the nut on the body member.

A second embodiment of the invention is depicted in FIG. 3 as comprising nut 70, body member 71, tube 72 and forward and rear sleeve sections 74, 75. In a manner similar to that shown in the preferred embodiment of the invention, nut 70 includes internal threads 76 at the forward end thereof, a conical cam surface 77 at the rearward end and intermediate stop shoulder 78. Body member 71 includes external threads 79 and face seal 80 located in an annular groove at the perpendicular seal face thereof.

Forward sleeve section 74 includes central bore 81, counterbore 82 and groove 83, and terminates in rearwardly extending dogleg section 85 in a configuration similar to that described with respect to the preferred embodiment of the invention. However, dogleg section 85 terminates at a generally cylindrical terminal surface 86. The forward part of dogleg 85 comprises the rear wall 87 of groove 83 in a manner similar to that described with respect to the preferred embodiment of the invention. Rear sleeve section 75 comprises outer conical cam surface 88 and a plurality of internal annular cutting edges 89 at the rear end together with extension 90 at the forward end. Forward extension 90 is generally cylindrical in configuration and has an internal cylindrical periphery sized to be a press fit on the dogleg end surface 86 and which extends into engagement with a rear stop surface 92 of forward sleeve section 74.

It will be apparent in this embodiment of the invention that a similar deformation of sleeve sections 74, 75 occurs as that previously described. That is, as nut 70 is threaded onto body member 71, cam surface 77 will move axially relative to cam surface 88 of sleeve section 75 causing radial collapse of sleeve section 75 and penetration of cutting edges 89 into the surface of tube 72. Collapse of rear sleeve section 75 will cause collapse of forward extension 90 with a consequent collapse of dogleg section 85 until the intersection surface 95 of dogleg 85 is firmly engaged or embedded into the outer periphery of tube 72. In this manner, groove 83 of forward sleeve section 74 will be completely closed by rear wall 87 to prevent rearward extrusion of the elastomeric o-ring seal 99 located therein. Since the forward end of rear sleeve section 75 is free, it may collapse to a lesser degree than the rear end to provide a measure of accommodation for the tolerances of tube 72 and the components of this fitting.

We claim:

1. A fitting for joining thin wall tube and the like to a threaded body member having an axial bore therein, comprising a nut having threads thereon adapted for engagement with the threads of said body member for drawing said nut and body member axially together, said threads being disposed at the forward end of said nut, a bore in said nut adapted to receive said tube, a conical surface in said nut adjacent the rear end thereof, said conical surface opening forwardly, a recessed surface in said nut forwardly of said conical surface, a sleeve adapted for placement on said tube, said sleeve having a conical exterior surface of said nut and adapted for collapse onto said tube upon threaded engagement of said nut on said body member, bite means at the rearward end of said sleeve for biting engagement with said tube for restraining rearward movement of said tube, an annular head at the forward end of said sleeve in engagement with said body member, an internal annular recess in said sleeve head, a seal disposed in said sleeve recess engageable with the external periphery of said tube, and a dogleg-shaped bend in said sleeve between said conical surface and said head, said dogleg-shaped bend comprising an outwardly rearwardly flared conical section and an outwardly forwardly flared conical section with an elbow intersection therebetween, said dogleg-shaped bend being deformable such that said elbow intersection moves into engagement with the peripheral surface of said tube as said nut is threaded upon said body member, to prevent extrusion of said seal rearwardly of said dogleg.

2. The fitting set forth in claim 1 wherein said annular head further comprises stop means thereon for limiting relative axial movement between said nut and said body member thereby limiting penetration of said bite means.

3. The fitting set forth in claim 2 wherein said stop means comprises front and rear shoulders on said annular head engageable respectively with said body member and said nut.

4. The fitting set forth in claim 3 wherein said stop shoulders are generally perpendicular to the axis of said fitting.

5. The fitting set forth in claim 4 wherein said nut includes a perpendicular stop shoulder at the rearward end of said recessed surface engageable with said rear shoulder of said sleeve.

6. The fitting set forth in claim 1 further comprising seal means disposed between said annular head of said sleeve and said body member.

7. The fitting set forth in claim 6 wherein said annular head includes a generally perpendicular front shoulder and said seal means comprises a face seal disposed between said front shoulder and said body member.

8. The fitting set forth in claim 7 wherein said body member includes a generally perpendicular rear face thereon and said face seal is an annular elastomeric seal disposed in an annular groove in said body member face.

9. The fitting set forth in claim 8 wherein said annular head includes stop means thereon for limiting axial movement of said nut.

10. The fitting set forth in claim 9 wherein said nut includes a stop shoulder thereon engageable with said stop means of said annular head.

* * * * *

UNITED STATES PATENT AND TRADEMARK OFFICE
CERTIFICATE OF CORRECTION

PATENT NO. : 4,867,489

DATED : September 19, 1989

INVENTOR(S) : Hiralal V. Patel

It is certified that error appears in the above-identified patent and that said Letters Patent is hereby corrected as shown below:

On the title page Serial No. should read --099,183--.

Signed and Sealed this

Twenty-eighth Day of August, 1990

Attest:

HARRY F. MANBECK, JR.

*Attesting Officer*   *Commissioner of Patents and Trademarks*